(12) United States Patent
Li

(10) Patent No.: US 8,831,621 B2
(45) Date of Patent: Sep. 9, 2014

(54) SMALL BASE STATION APPARATUS AND METHOD OF ASSIGNING SUBBANDS

(75) Inventor: Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 47 days.

(21) Appl. No.: 13/582,169

(22) PCT Filed: Feb. 14, 2011

(86) PCT No.: PCT/JP2011/000797
§ 371 (c)(1),
(2), (4) Date: Aug. 31, 2012

(87) PCT Pub. No.: WO2011/108197
PCT Pub. Date: Sep. 9, 2011

(65) Prior Publication Data
US 2012/0322506 A1 Dec. 20, 2012

(30) Foreign Application Priority Data
Mar. 4, 2010 (JP) ................................. 2010-047985

(51) Int. Cl.
*H04W 36/00* (2009.01)
*H04W 72/08* (2009.01)
*H04W 72/04* (2009.01)
*H04W 28/04* (2009.01)
*H04W 88/08* (2009.01)
*H04W 84/04* (2009.01)
*H04W 28/16* (2009.01)

(52) U.S. Cl.
CPC ........ *H04W 72/082* (2013.01); *H04W 72/0453* (2013.01); *H04W 28/04* (2013.01); *H04W 88/08* (2013.01); *H04W 84/045* (2013.01); *H04W 28/16* (2013.01)
USPC ........ 455/444; 455/443; 455/436; 455/422.1; 455/450; 455/561; 370/331; 370/328; 370/338

(58) Field of Classification Search
CPC .... H04W 72/04; H04W 72/012; H04W 16/02
USPC .......... 455/561, 436–444, 450–453; 370/319, 370/321, 326, 330, 336, 337, 343, 344, 328, 370/338
See application file for complete search history.

(56) References Cited

U.S. PATENT DOCUMENTS 6,920,122 B1 * 7/2005 Hanaoka et al. ............... 370/331
7,085,560 B2 * 8/2006 Petermann .................. 455/422.1
(Continued)

FOREIGN PATENT DOCUMENTS

CN 1989775 6/2007
JP 2007-529915 10/2007
(Continued)

OTHER PUBLICATIONS

International Search Report dated May 17, 2011.
(Continued)

*Primary Examiner* — Sharad Rampuria
(74) *Attorney, Agent, or Firm* — Dickinson Wright PLLC

(57) ABSTRACT

Provided is a small base station apparatus (HeNB), wherein interference between the HeNB and an MeNB can be inhibited, without any exchange of information between the HeNB and the MeNB. In the HeNB (100), which forms a cell smaller than a cell formed by the MeNB, a pattern generation unit (101) generates an assigning pattern of subbands to be assigned to the HeNB (100), from among a plurality of subbands that can be used by the HeNB (100), wherein combinations of subbands are different for each of the frames. An assignment unit (102) assigns subbands to communication terminal apparatuses connected to the HeNB (100), on the basis of the assigning pattern.

6 Claims, 15 Drawing Sheets

(56) References Cited

U.S. PATENT DOCUMENTS

| | | | |
|---|---|---|---|
| 7,453,841 B2* | 11/2008 | Motegi et al. | 370/328 |
| 7,848,439 B2* | 12/2010 | She et al. | 375/260 |
| 7,853,282 B2* | 12/2010 | Wu et al. | 455/522 |
| 8,259,658 B2* | 9/2012 | Nishio et al. | 370/329 |
| 8,355,734 B2* | 1/2013 | Naden et al. | 455/450 |
| 8,472,886 B2* | 6/2013 | Haas et al. | 455/73 |
| 8,744,362 B2* | 6/2014 | Kawahatsu et al. | 455/63.1 |
| 2009/0135754 A1 | 5/2009 | Yavuz | |
| 2009/0135790 A1 | 5/2009 | Yavuz | |
| 2009/0135796 A1 | 5/2009 | Nanda | |
| 2009/0137221 A1 | 5/2009 | Nanda | |
| 2009/0137241 A1* | 5/2009 | Yavuz et al. | 455/423 |
| 2009/0252099 A1 | 10/2009 | Black | |
| 2009/0310558 A1 | 12/2009 | Koyanagi | |

FOREIGN PATENT DOCUMENTS

| | | |
|---|---|---|
| JP | 2008-278265 | 11/2008 |
| JP | 2011-508473 | 3/2011 |
| WO | 2005/062798 | 7/2005 |
| WO | 2008/105091 | 9/2008 |
| WO | 2009/070618 | 6/2009 |

OTHER PUBLICATIONS

3GPP TSG-RAN WG4 Meeting #52bis, "Intercell interference management for HeNBs," R4-093651, Oct. 12-16, 2009, pp. 1-7.

3GPP TS 36.300 V9.2.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," Dec. 2009, pp, 1-178.

* cited by examiner

SMALL BASE STATION APPARATUS AND METHOD OF ASSIGNING SUBBANDS

TECHNICAL FIELD

The present invention relates to a micro base station apparatus and a method of assigning subbands.

BACKGROUND ART

Recently, micro base station apparatuses (home base station: Home eNB, hereinafter HeNB) to form small cells have been developed for complementing dead zones of mobile phone networks. The small cell is referred to as a femto cell, covering a smaller communication area than one conventional cell. Conventional large base station apparatuses to form cells having large communication areas (Macro base station: Macro eNB, hereinafter referred to as an MeNB) are set beforehand through an appropriate design of placement of stations by operators. Interference between cells does not make a significant problem owing to an ICIC (Inter Cell Interference Coordination) control function between the MeNBs. In contrast with this, end users can set HeNBs in any place and there is no ICIC control function between the HeNB and the MeNB. Interference between the HeNB and the MeNB therefore makes a significant problem in HeNB. Especially, the placement of the HeNB should not interfere with the communications of any existing MeNB. This is because the MeNB is used for forming an existing communication area, for example, for mobile phone networks, and it is necessary to avoid inconvenience such as sudden disconnection of the mobile phones caused by a newly placed HeNB.

With LTE (Long Term Evolution) which has been standardized by international standards organization 3GPP (3rd Generation Partnership Project), subbands allocated to the HeNB are scheduled in a frequency band (including a plurality of subbands) available for the HeNB (see, for example, Non-patent Literature 1). The HeNB assigns subbands based on the resulting schedule and communicates with a communication terminal apparatus (hereinafter, referred to as HUE: Home UE) connected to the HeNB.

With LTE, MeNBs (surrounding MeNBs) are connected to each other by an X2 interface. Each eNB (an MeNB and an HeMB), and an MME (Mobility Management Entity)/S-GW (Serving Gateway) or an HeNB GW are connected by an S1 interface (see, for example, Non-Patent Literature 2). By contrast with this, LTE has no interface directly connecting the MeNB and the HeNB.

CITATION LIST

Non-Patent Literature

NPL 1
R4-093651 "Intercell interference management for HeNBs" (ETRI)
NPL 2
3GPP TS 36.300 v9.2.0, "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In the above conventional technique, subbands assigned to the HeNB through scheduling are fixed (the same subband) over a plurality of frames. When the MeNB and the HeNB exchange no control information at this time, the MeNB may assign the same subband as the subband allocated to the HeNB, to a communication terminal apparatus connected to the MeNB (hereinafter referred to as an MUE: Macro UE). That is to say, subbands used in the MeNB and the HeNB may overlap.

In this case, when the MUE receives downlink signals (desired signals) from the MeNB, the MUE may receive interference due to signals transmitted from the HeNB to the HUE in downlink. Also, when the MeNB receives uplink signals (desired signals) from the MUE, the MeNB may receive interference due to signals transmitted from an HUE located in the vicinity of the MeNB to the HeNB in uplink. In view of the above, the communications of the HeNB may interfere with the existing communications of the MeNB.

When the HeNB receives uplink signals (desired signals) from the HUE, the HeNB may receive interference due to signals transmitted from an MUE located in the vicinity of the HeNB to the MeNB in uplink. When the HUE receives downlink signals (desired signals) from the HeNB, the HUE may receive interference due to signals transmitted from the MeNB to the MUE in downlink. That is to say, the communications of the MeNB may interfere with the communications of the HeNB.

Here, the exchange of control information (for example, information indicating used MeNB subbands) between the MeNB and the HeNB prevents subbands used between the MeNB and the HeNB from overlapping. However, there is no interface that directly connects the MeNB with the HeNB, as described above. Furthermore, when the MeNB and the HeNB exchange information using an Si interface, the information need to be transmitted through other devices (for example, MME/S-GW), so that the delay of a process occurs.

It is an object of the present invention to provide a micro base station apparatus and a subband assigning method that can suppress interference between an HeNB and an MeNB without exchanging information between the MeNB and the HeNB.

Solution to Problem

A micro base station apparatus according to the first aspect of the present invention is a micro base station apparatus forming a smaller cell than a cell formed by a macro base station apparatus, and employs a configuration including: a generation section that generates an assigning pattern of subbands assigned to the micro base station apparatus among a plurality of subbands available for the micro base station apparatus, the assigning pattern having a subband combination which varies every predetermined time interval; and an assignment section that assigns the subbands to a communication terminal apparatus connected to the micro base station apparatus, based on the assigning pattern.

A method for assigning subbands according to the second aspect of the present invention is a method for assigning subbands in a micro base station apparatus forming a smaller cell than a cell formed by a macro base station apparatus, and employs a configuration including the steps of: generating an assigning pattern of subbands assigned to the micro base station apparatus among a plurality of subbands available for the micro base station apparatus, the assigning pattern having a subband combination which varies every predetermined time interval; and assigning the subbands to a communication terminal apparatus connected to the micro base station apparatus based on the assigning pattern.

Advantageous Effects of Invention

According to the present invention, it is possible to suppress interference between an HeNB and an MeNB without exchanging information between the MeNB and the HeNB.

DESCRIPTION OF EMBODIMENTS

Embodiments according to the present invention will be described below in detail with reference to the drawings. In the following explanation, embodiments will be described using an LTE as an example, (Embodiment 1)

Figure 1:
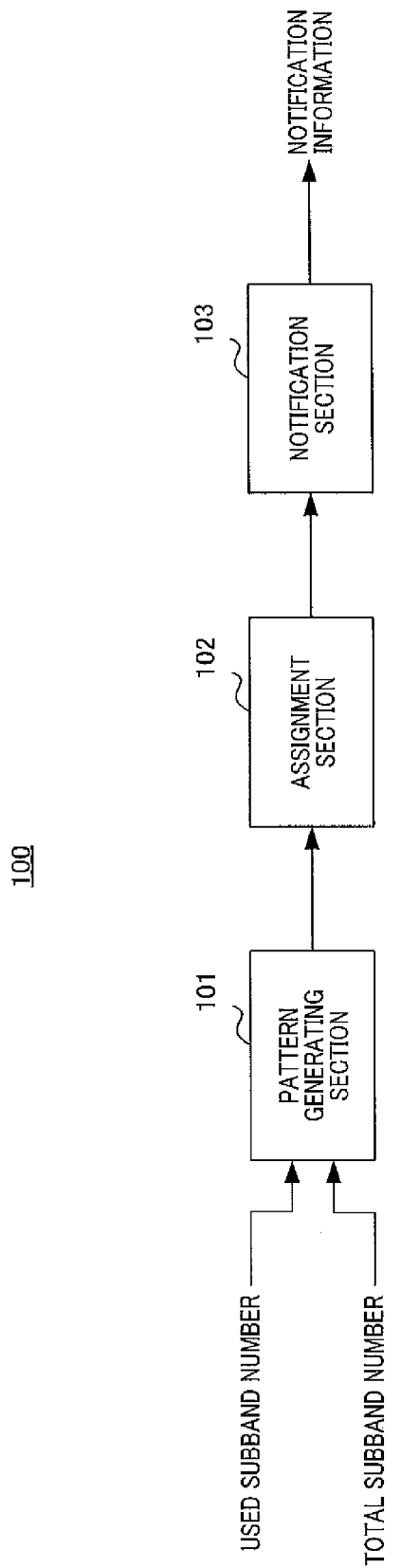
FIG. 1 is a block diagram showing a configuration of an HeNB according to Embodiment 1 of the present invention.

FIG. 1 is a block diagram showing a configuration of an HeNB forming a smaller cell than one formed by an MeNB. In HeNB 100 shown in FIG. 1, pattern generating section 101 receives as input information showing the number of subbands used by HeNB 100 (the number of used subbands) and a total number of subbands available for HeNB 100. Pattern generating section 101 then generates an assigning pattern of subbands assigned to HeNB 100 (and an HUE), based on the number of used subbands and the total number of subbands. Specifically, pattern generating section 101 selects subbands assigned to HeNB 100 (an HUE) (the number of used subbands) from among a plurality of subbands available for HeNB 100 (the total number of subbands), and generates an assigning pattern including the selected subbands. Pattern generating section 101 generates an assigning pattern having a subband combination which varies every predetermined time interval (one frame in the present embodiment). The predetermined time interval is not limited to one frame, and may be a plurality of frames (this is the same as in the following embodiments).

Assignment section 102 assigns subbands to an HUE based on the assigning pattern inputted from pattern generating section 101.

Notification section 103 notifies an HUE connected to HeNB 100 of notification information showing subband assignment result in assignment section 102.

Details of a process in HeNB 100 will be then described.

Figure 2:
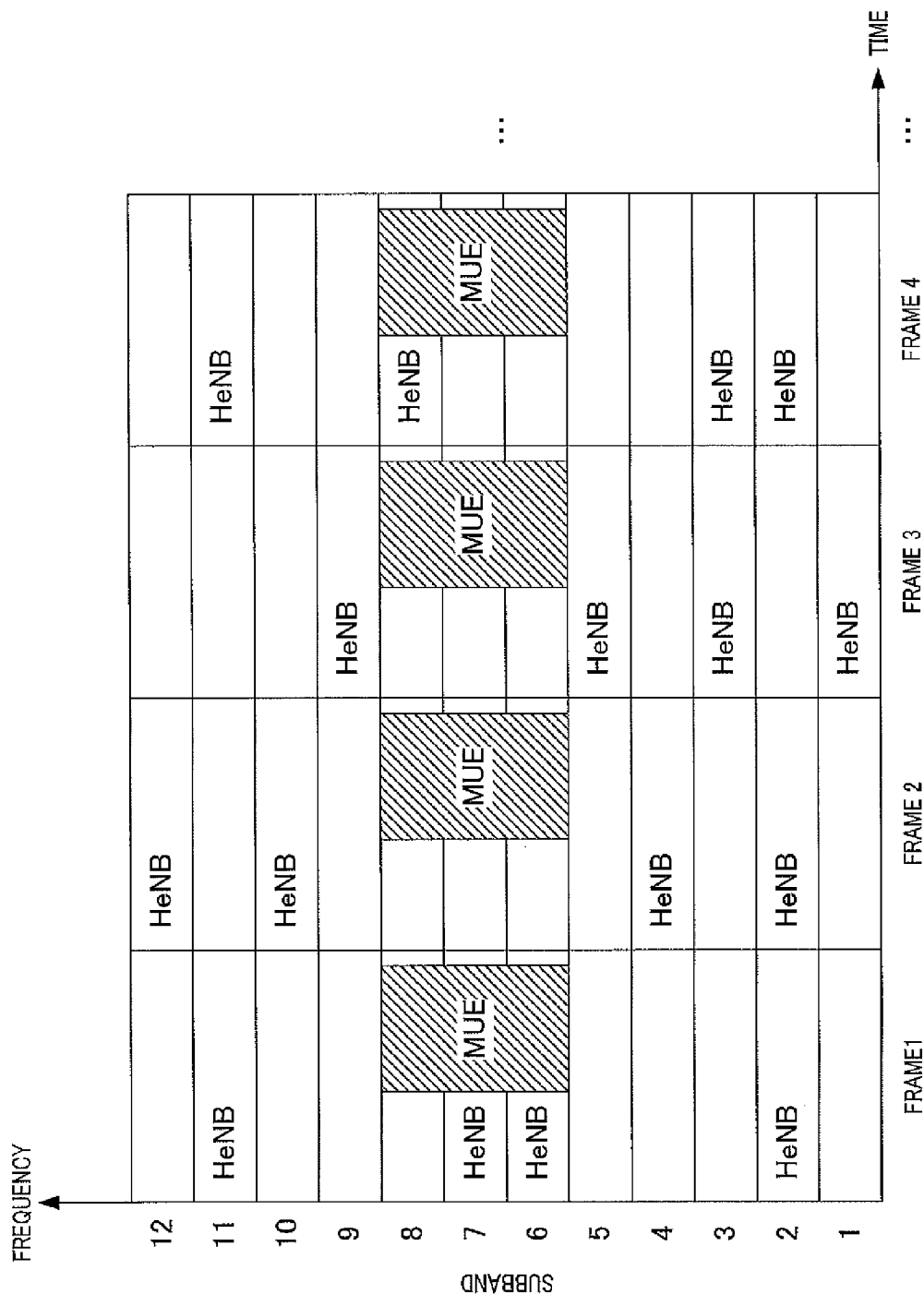
FIG. 2 is a drawing showing an assigning pattern according to Embodiment 1 of the present invention.

In the following description, subbands available for HeNB 100 are defined to be subbands 1 to 12 (subband total number: 12) as shown in FIG. 2. Subbands used for HeNB 100 in each frame are assumed to be four (the number of used subbands: 4). As shown in FIG. 2, MUEs are assigned to three subbands 6 to 8 over a plurality of frames.

Pattern generating section 101 generates an assigning pattern of subbands assigned to HeNB 100 (Here, four subbands) among twelve subbands 1 to 12 shown in FIG. 2, every frame. At this time, pattern generating section 101 generates an assigning pattern having a subband combination which varies every frame. Pattern generating section 101 randomly selects four subbands from subbands 1 to 12 shown in FIG. 2 every frame, thereby generating an assigning pattern having a subband combination which varies every frame, for example.

In frame 1 shown in FIG. 2, pattern generating section 101, for example, generates an assigning pattern including a combination of subbands 2, 6, 7, and 11. As shown in FIG. 2, pattern generating section 101 also generates an assigning pattern including a combination of subbands 2, 4, 10, and 12 in frame 2, an assigning pattern including subbands 1, 3, 5, and 9 in frame 3, an assigning pattern including subbands 2, 3, 8, and 11 in frame 4.

Figure 3:
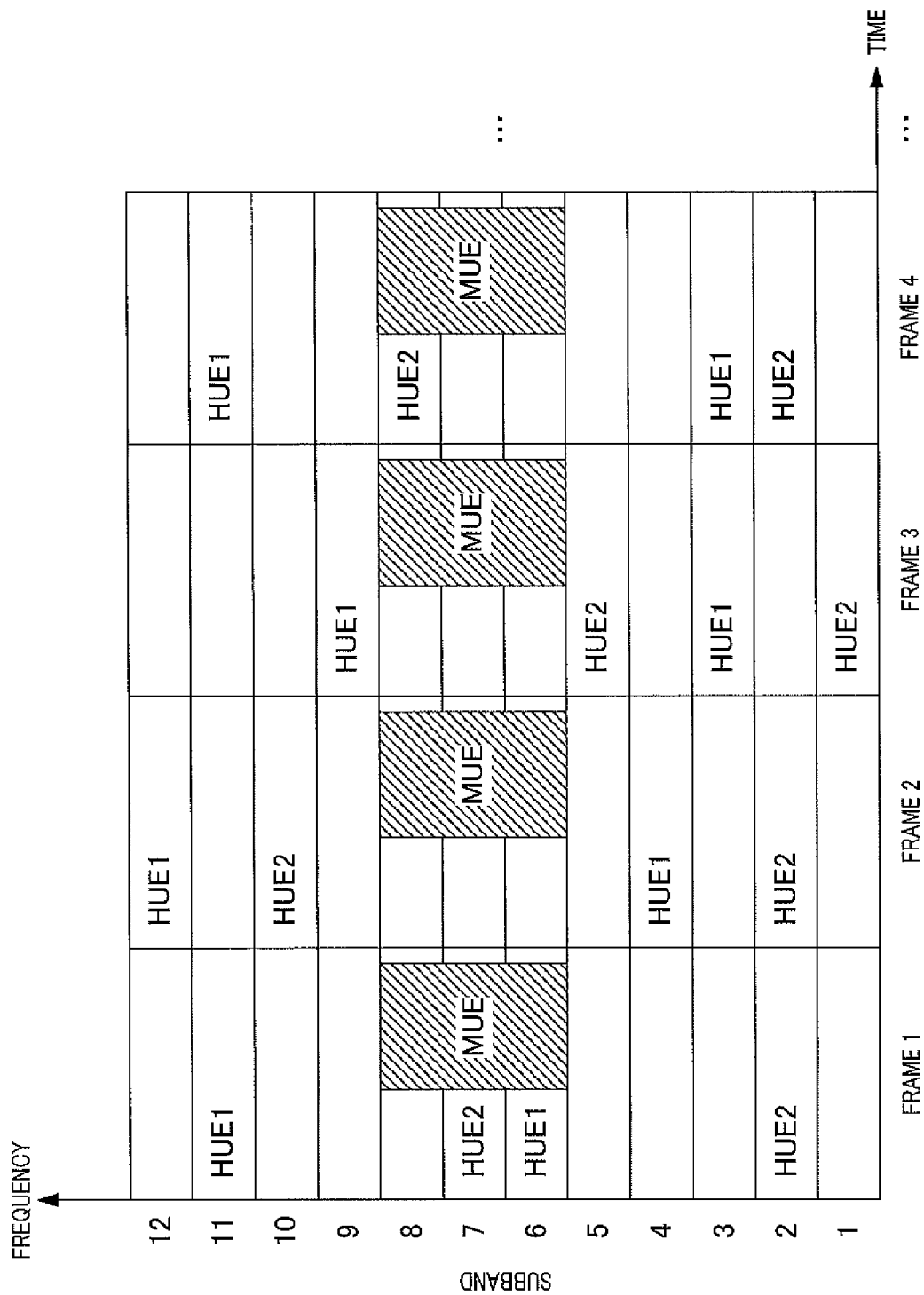
FIG. 3 is a drawing showing an assigning pattern according to Embodiment 1 of the present invention.

Here, it is assumed that HUE 1 and HUE 2 are connected to HeNB 100. As shown in FIG. 3, assignment section 102 assigns subbands to each of HUE 1 and HUE 2 based on the assigning pattern shown in FIG. 2. In frame 1 shown in FIG. 3, assignment section 102 assigns subbands 6 and 11 to HUE 1, and assigns subbands 2 and 7 to HUE 2 among subbands 2, 6, 7, and 11 shown in the assigning pattern, for example. In frame 2 shown in FIG. 3, assignment section 102 similarly assigns subbands 4 and 12 to HUE 1, and assigns subbands 2 and 10 to HUE 2 among subbands 2, 4, 10, and 12 shown in the assigning pattern. In frame 3 and frame 4 shown in FIG. 3, assignment section 102 assigns subbands in the same manner as the above.

Pattern generating section 101 and assignment section 102 perform the same process as the above on frames other than frames 1 to 4 (frame 5 and thereafter, not shown).

Then, notification section 103 notifies HUE 1 and HUE 2 of notification information showing a subband assignment result shown in FIG. 3.

In view of the above, even if the same subband is assigned to the HUE and the MUE in a frame (for example, frame 1 shown in FIG. 3), varying a subband combination included in a subband assigning pattern every frame reduces the probability that the same subband is assigned to the HUE and the MUE in the next frame (for example, frame 2 shown in FIG. 3). That is to say, each subband (subbands 1 to 12 shown in FIG. 3) is equally assigned to HeNB 100, so that the probability that subbands used for HeNB 100 and the MeNB overlap over a plurality of frames is reduced.

Accordingly, the above process reduces the probability that signals transmitted from an HeNB to the HUE in downlink interfere with the MUE when the MUE receives downlink signals (desired signals) from the MeNB, for example. Moreover, the above process reduces the probability that signals transmitted from the MeNB to the MUE in downlink interfere with the HUE when the HUE receives downlink signals (desired signals) from the HeNB.

Figure 4:
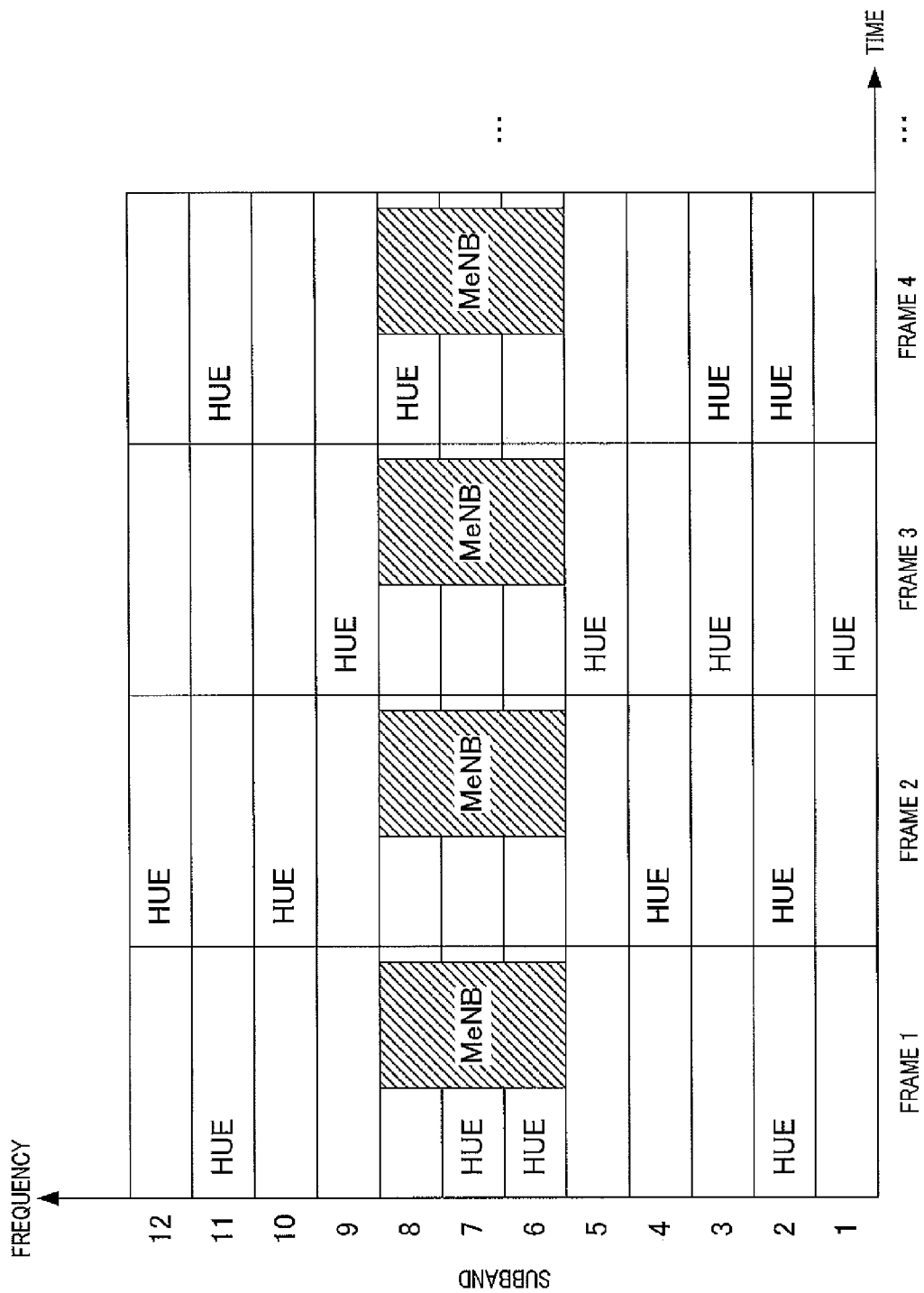
FIG. 4 is a drawing showing an assigning pattern according to Embodiment 1 of the present invention.

Next, as shown in FIG. 4, a case will be described where an MeNB is assigned to three subbands 6 to 8 over a plurality of frames as with FIG. 3. In FIG. 4, pattern generating section 101 of HeNB 100 generates the assigning pattern shown in FIG. 2 and assignment section 102 assigns subbands to UEs based on the assigning pattern shown in FIG. 2.

In FIG. 4 as well, the above process reduces the probability that signals transmitted from an HUE located in the vicinity of the MeNB to the HeNB in uplink interfere with the MeNB over a plurality of frames when the MeNB receives uplink signals (desired signals) from the MUE, for example. The above process reduces the probability that signals transmitted from an MUE located in the vicinity of the HeNB to the MeNB in uplink interfere with the HeNB over a plurality of frames when the HeNB receives uplink signals (desired signals) from the HUE.

That is to say, varying a subband combination included in a subband assigning pattern, every frame can randomize (average) interference between the MeNB (MUE) and the HeNB (HUE) as shown in FIG. 3 and FIG. 4. This makes it possible to reduce the probability that the communications of HeNB 100 interfere with the communications of an existing MeNB and to reduce the probability that the communications of the MeNB interfere with the communications of HeNB 100.

HeNB 100 also generates a subband assigning pattern based on only a total number of subbands available for HeNB 100 and the number of used subbands for HeNB 100. That is to say, HeNB 100 can generate a subband assigning pattern without exchanging information (for example, information showing the used MeNB subbands) with the MeNB.

According to the present embodiment, it is possible to suppress interference between an HeNB and an MeNB without exchanging information between the MeNB and the HeNB.

(Embodiment 2)

Figure 5:
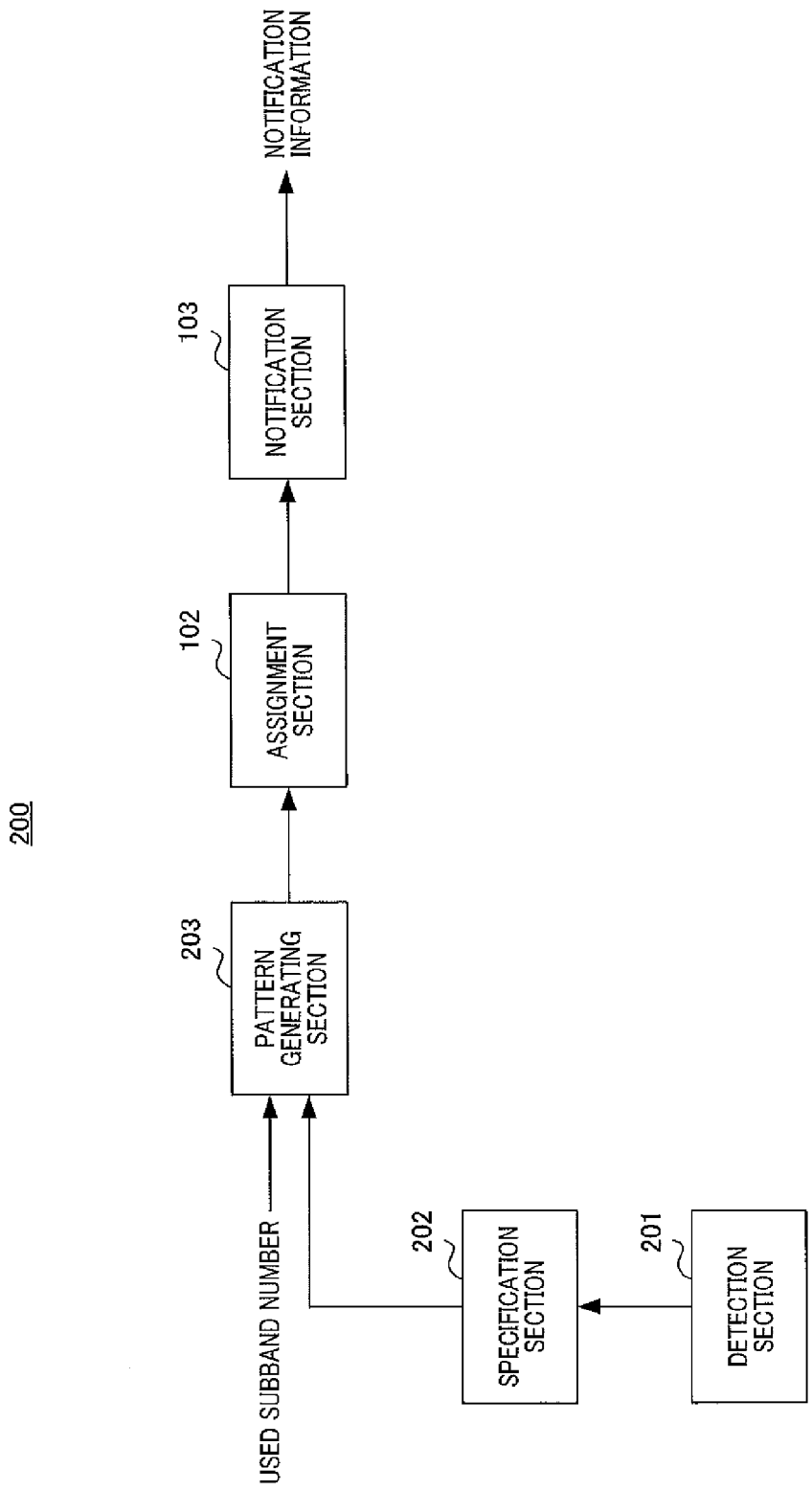
FIG. 5 is a block diagram showing a configuration of an HeNB according to Embodiment 2 of the present invention.

FIG. 5 is a block diagram showing a configuration of an HeNB according to the present embodiment. Here, in FIG. 5, the same components as in FIG. 1 will be assigned the same reference numerals, and overlapping descriptions will be omitted.

In HeNB 200 according to the present embodiment shown in FIG. 5, detection section 201 detects signals from an MUE (uplink signals transmitted from the MUE to an MeNB) from signals received in the reception section of HeNB 200 (not shown).

Specification section 202 specifies subbands (positions and the number of subbands) to which signals from the MUE are assigned among a plurality of subbands, using the signals detected in detection section 201. Specification section 202, for example, specifies subbands to which signals having lager power than a preset threshold are assigned among the signals detected in detection section 201. In other words, specification section 202 specifies the subbands (interference bands) which may interfere with HeNB 200 (or the HUE). Specification section 202 then outputs subband information showing the specified subbands to pattern generating section 203.

Pattern generating section 203 generates an assigning pattern of subbands assigned to HeNB 200 (and the HUE) based on the number of used subbands of HeNB 200 and the subband information inputted from specification section 202. Specifically, pattern generating section 203 selects subbands assigned by HeNB 200 to the HUE, in subbands other than subbands to which signals from the MUE are assigned (interference bands), from among a plurality of subbands available for HeNB 200, and generates an assigning pattern including the selected subbands (subbands assigned to the HUE).

Next, a process in HeNB 200 according to the present embodiment will be described in detail.

Figure 6:
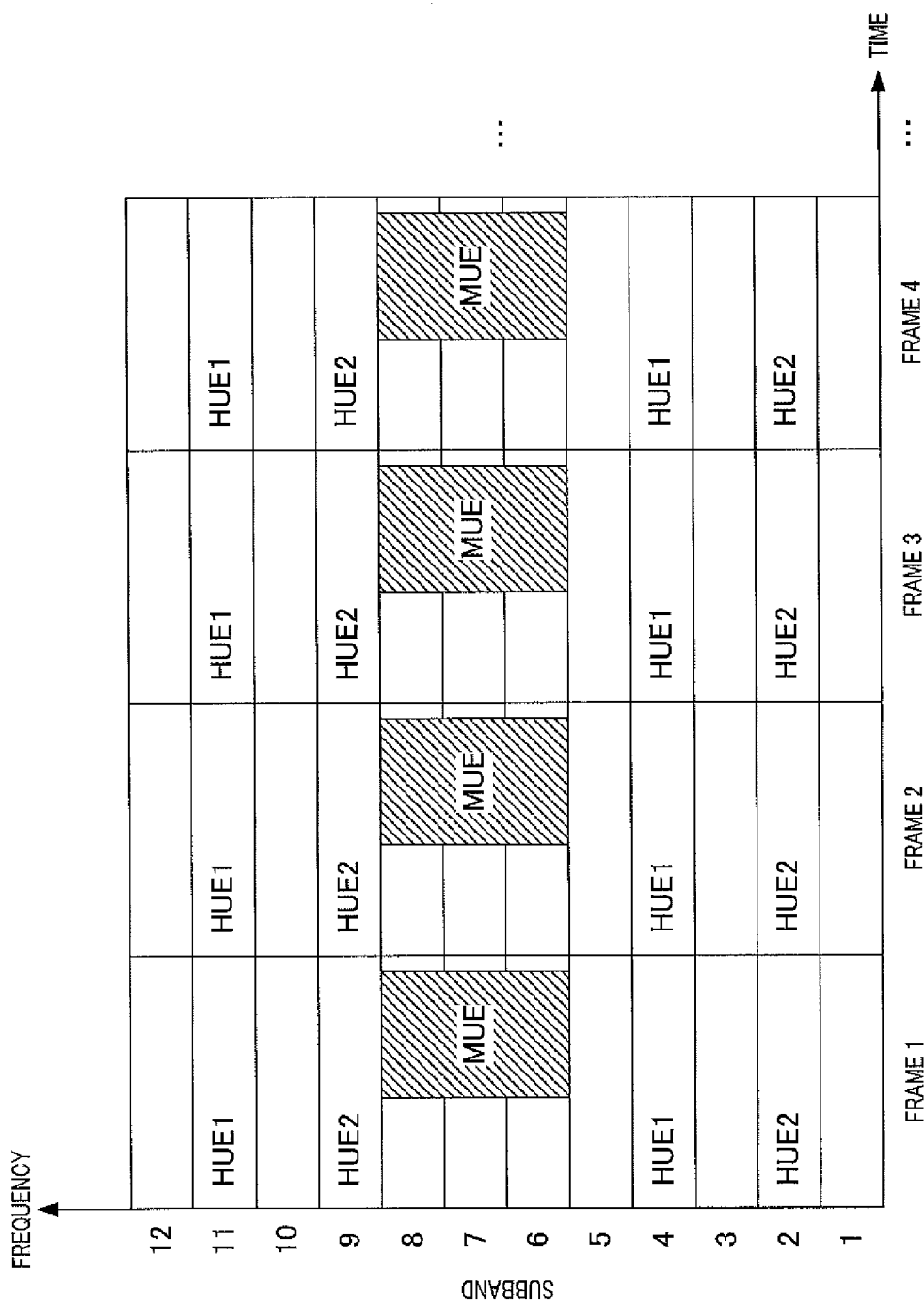
FIG. 6 is a drawing showing an assigning pattern according to Embodiment 2 of the present invention.

In the following description, subbands available for HeNB 200 are assumed to be subbands 1 to 12 (subband total number: 12) as shown in FIG. 6 as with Embodiment 1. Subbands used for HeNB 200 in each frame are assumed to be four (the number of used subbands: 4) as with Embodiment 1.

In FIG. 6, specification section 202 specifies three subbands 6 to 8 as subbands (interference bands) to which signals having lager power than a preset threshold are assigned, among the signals from the MUE detected in detection section 201.

Pattern generating section 203 generates an assigning pattern of subbands (four subbands) assigned to HeNB 100 in subbands (subbands 1 to 5 and subbands 9 to 12) other than subbands 6 to 8 (interference bands) specified in specification section 202, among twelve subbands 1 to 12 shown in FIG. 6.

Pattern generating section 203, for example, generates an assigning pattern including a combination of subbands 2, 4, 9, and 11 among subbands 1 to 5 and subbands 9 to 12 (subbands other than subbands 6 to 8) as shown in FIG. 6.

Here, HUE 1 and HUE 2 are assumed to be connected to HeNB 200 as with Embodiment 1 (FIG. 3). Assignment section 102 assigns subbands 4 and 11 to HUE 1, and assigns subbands 2 and 9 to HUE 2 among subbands 2, 4, 9, and 11 shown in the assigning pattern, as shown in FIG. 6.

In view of the above, HeNB 200 generates a subband assigning pattern to the HUE in subbands other than subbands to which signals which may interfere with HeNB 200 (HUE) (signals from an MUE) are assigned. That is to say, HeNB 200 does not assign subbands to which signals having a possibility of interfering with HeNB 200 (HUE) are assigned, to the HUE.

By this means, HeNB 200 (HUE) and the MUE which may interfere with HeNB 200 are not assigned to the same subband over all frames. Accordingly, in FIG. 6, signals transmitted from the HeNB to the HUE in downlink do not interfere with the MUE when the MUE receives downlink signals (desired signals) from the MeNB, for example. Moreover, signals transmitted from the MeNB to the MUE in downlink do not interfere with the HUE when the HUE receives downlink signals (desired signals) from the HeNB.

Similarly, even when the MeNB is assigned to three subbands 6 to 8 over a plurality of frames instead of the MUE shown in FIG. 4 (not shown), for example, signals transmitted from the HUE located in the vicinity of an MeNB to the HeNB in uplink do not interfere with the MeNB when the MeNB receives uplink signals (desired signals) from the MUE. Moreover, signals transmitted from an MUE located in the vicinity of the HeNB to the MeNB in uplink do not interfere with the HeNB when the HeNB receives signals (desired signals) from the HUE.

HeNB 200 also generates a subband assigning pattern based on only the signals from an MUE, which are detected in detection section 201, a total number of subbands available for HeNB 200, and the number of used subbands of HeNB 200. That is to say, HeNB 200 can generate a subband assigning pattern without exchanging information (for example, information showing the used MeNB subbands) with the MeNB, as with Embodiment 1.

In view of the above, according to the present embodiment, it is possible to suppress interference between an HeNB and an MeNB without exchanging information between the MeNB and the HeNB as with Embodiment 1.

Figure 7:
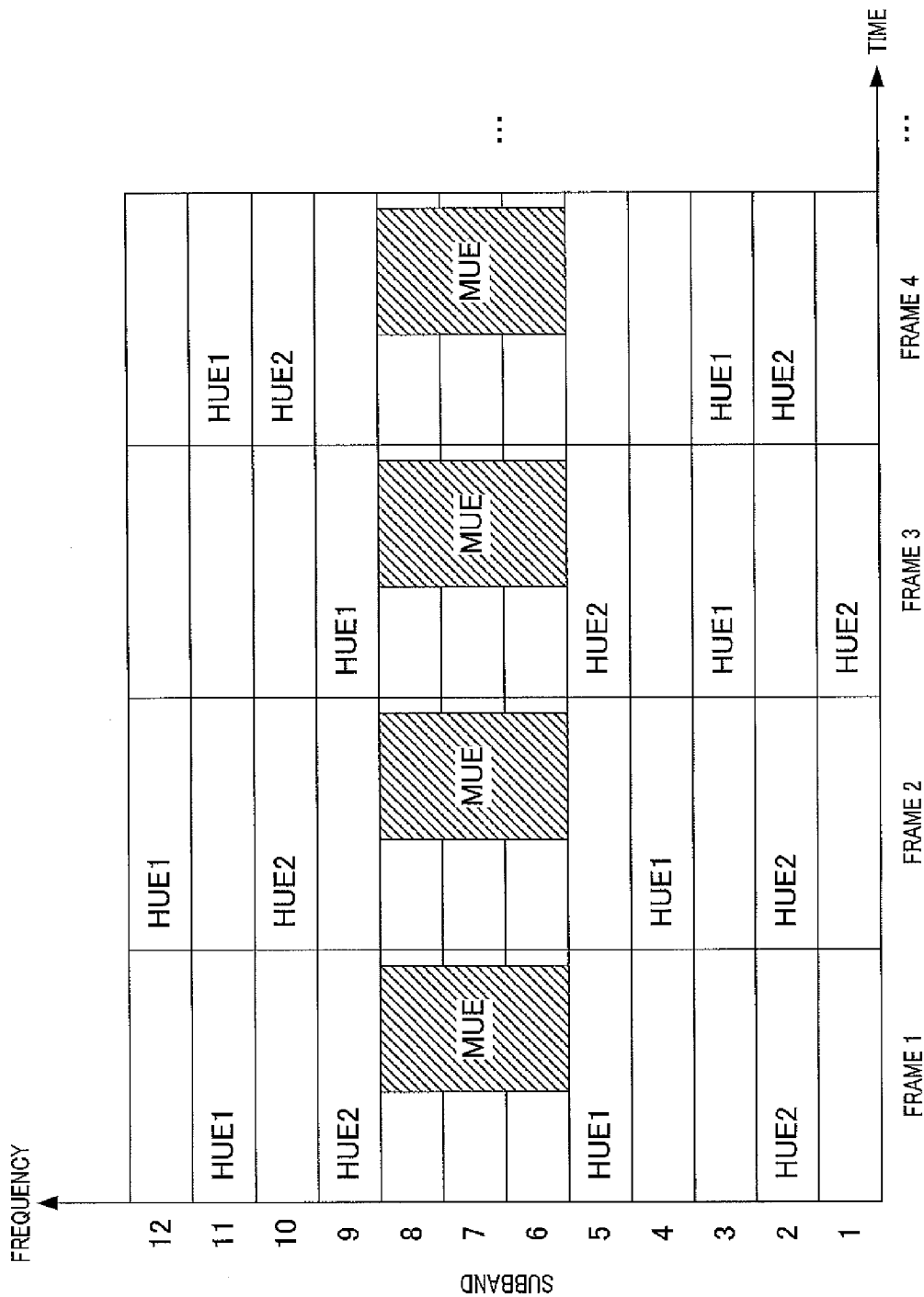
FIG. 7 is a drawing showing an assigning pattern according to Embodiment 2 of the present invention.

In the present embodiment, a case has been described where pattern generating section 203 in HeNB 200 employs the same subband combination included in the subband assigning pattern every frame. Pattern generating section 203 may vary a subband combination included in the assigning pattern every frame by combining the present embodiment with Embodiment 1. For example, pattern generating section 203 randomly selects four subbands every frame in subbands (subbands 1 to 5 and subbands 9 to 12) other than subbands 6 to 8 (interference bands) specified in specification section 202 from among twelve subbands 1 to 12, as shown in FIG. 7, thereby generating an assigning pattern having a subband combination which varies every frame.

This makes it possible to avoid assigning a subband to HeNB 200 (HUE) in interference bands (subbands 6 to 8 in FIG. 7) and prevent HeNB 200 (HUE) from receiving interference from the MUE (an MUE for which signals are assigned to subbands having higher received signal power than a threshold). Furthermore, employing the assigning pattern having a subband combination which varies every frame as with Embodiment 1 in subbands other than the interference bands can randomize (average) interference between other MUEs (MUEs for which signals are assigned to subbands having received signal power equal to or less than a threshold) and HeNB 200, and suppress interference between the MeNB and HeNB 200.

(Embodiment 3)

Figure 8:
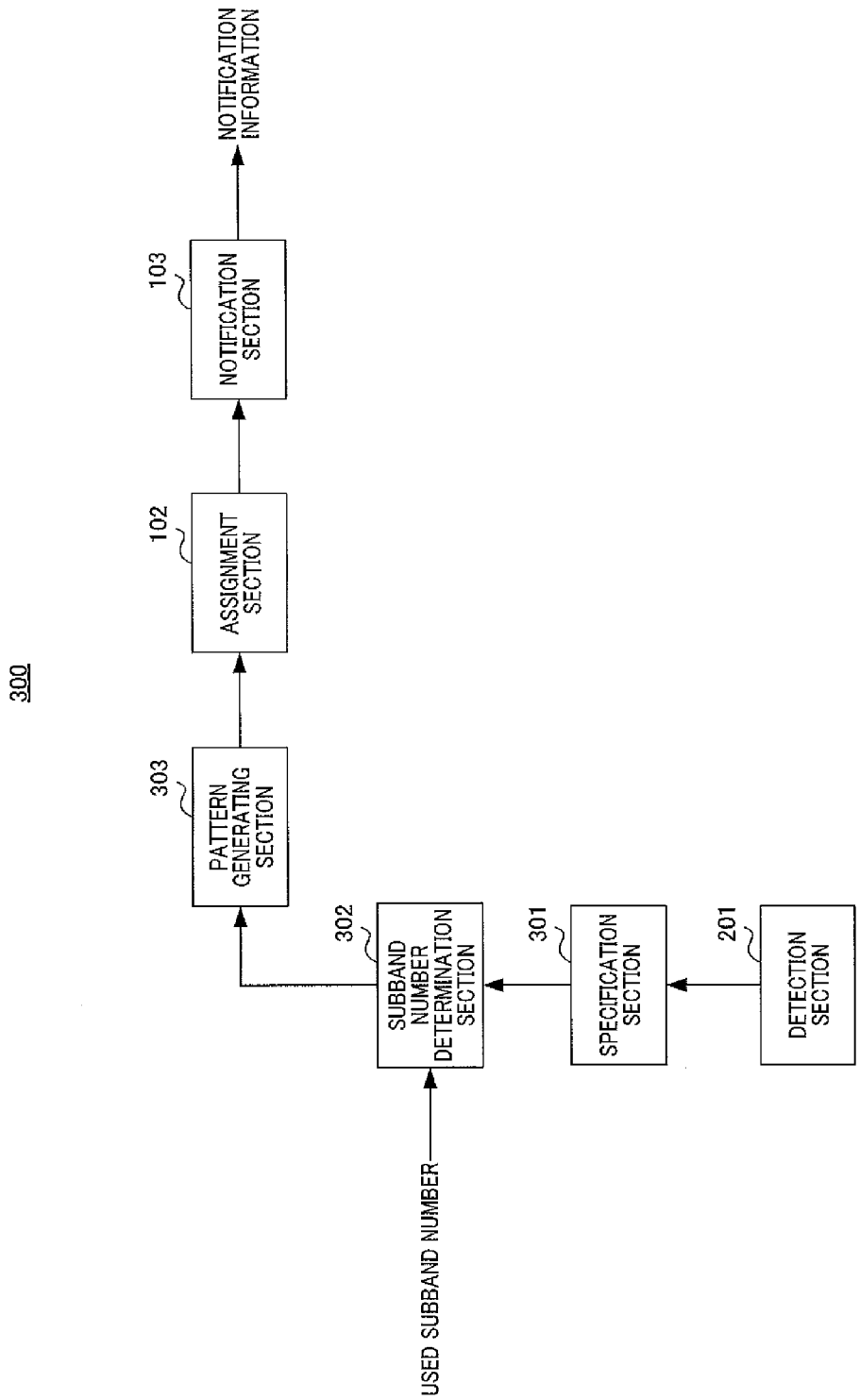
FIG. 8 is a block diagram showing a configuration of an HeNB according to Embodiment 3 of the present invention.

FIG. 8 is a block diagram showing a configuration of an HeNB according to the present embodiment. Here, in FIG. 8, the same components as in FIG. 5 will be assigned the same reference numerals, and overlapping descriptions will be omitted.

In HeNB 300 according to the present embodiment, specification section 301 specifies subbands (positions and the number of subbands) to which signals from an MUE are assigned among a plurality of subbands, using the signals detected in detection section 201, as with specification section 202 in Embodiment 2. Furthermore, specification section 301 specifies received signal power (that is to say, interference power) in subbands to which signals from the MUE are assigned.

Subband number determination section 302 first classifies a plurality of subbands available for HeNB 300 into a plurality of subband groups according to the level of the specified received signal power in specification section 301. That is to say, subband number determination section 302 groups the plurality of subbands available for HeNB 300 into subband groups including subbands having the same degree of received signal power. Subband number determination section 302 then determines the number of subbands used for an assigning pattern every subband group such that HeNB 300 is assigned to subband groups having lower received signal power. Here, a total number of subbands determined in each subband group is the number of used subbands of HeNB 300.

Pattern generating section 303 generates an assigning pattern of subbands assigned to HeNB 300 (and an HUE) based on the number of subbands determined in subband number determination section 302. Specifically, pattern generating section 303 generates the assigning pattern of subbands by extracting the number of subbands determined in each subband group in subband number determination section 302 from subbands in each subband group. That is to say, pattern generating section 303 generates the subband assigning pattern such that a larger number of subbands forming a subband group having lower received signal power are assigned to HeNB 300, among the plurality of subband groups resulting from the classification according to the level of received signal power.

Next, a process in HeNB 300 according to the present embodiment will be described in detail.

Figure 9:
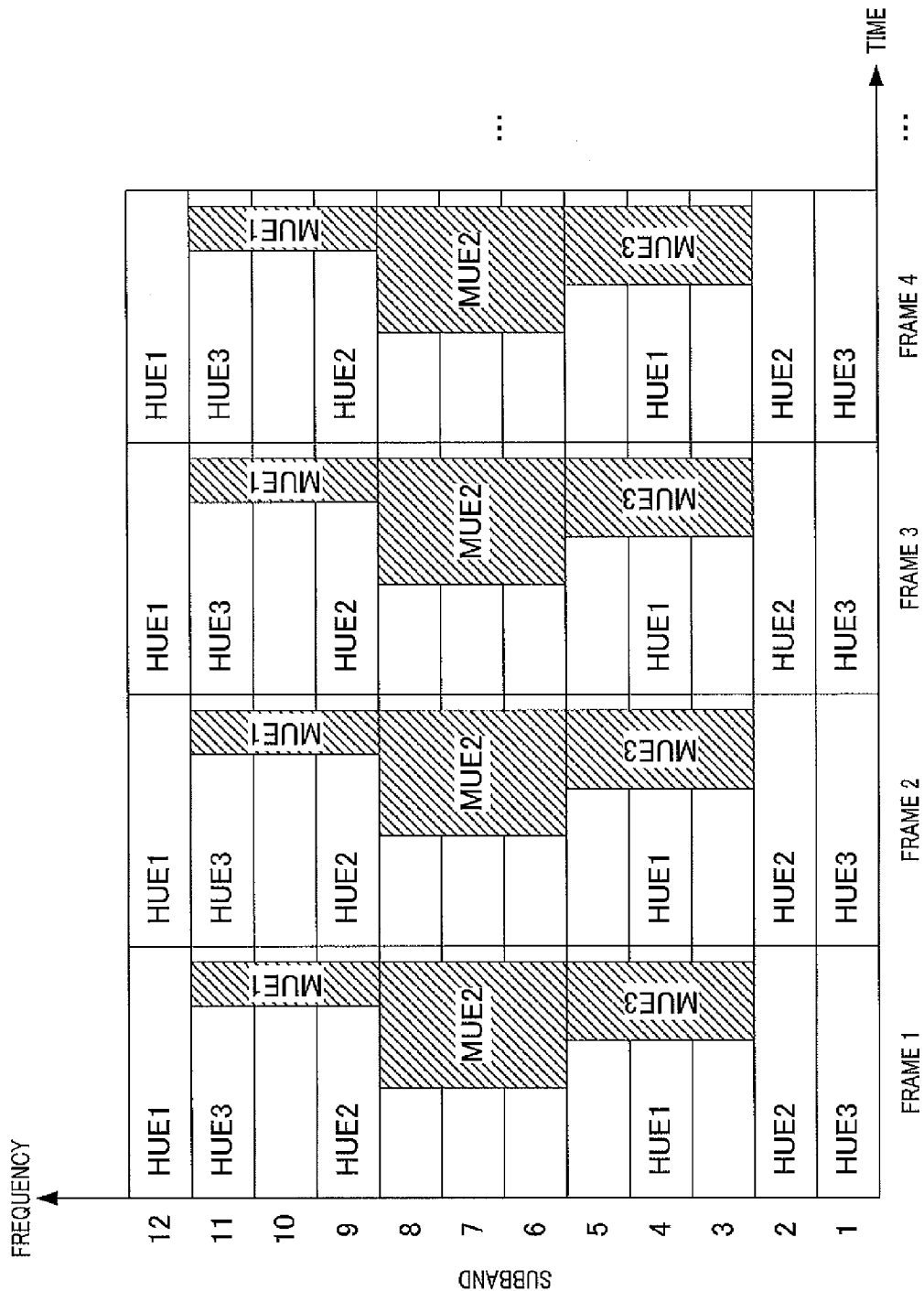
FIG. 9 is a drawing showing an assigning pattern according to Embodiment 3 of the present invention.

In the following description, subbands available for HeNB 300 are assumed to be subbands 1 to 12 (subband total number: 12) as shown in FIG. 9 as with Embodiment 1. Subbands used for HeNB 300 in each frame are assumed to be six (the number of used subbands: 6).

In FIG. 9, specification section 301 specifies subbands (subbands 3 to 11) to which signals from the MUEs are assigned, using the signals detected in detection section 201. Furthermore, specification section 301 specifies received signal power in subbands to which signals from the MUEs are assigned. In HeNB 300, subbands 6 to 8 (subbands to which signals from MUE 2 are assigned) have the highest received signal power, subbands 3 to 5 (subbands to which signals from MUE 3 are assigned) have the second highest received signal power, and subbands 9 to 11 (subbands to which signals from MUE 1 are assigned) have the third highest received signal power as shown in FIG. 9. Meanwhile, HeNB 300 does not detect any signals from the MUEs in subbands 1, 2, and 12, and received signal power in subbands 1, 2, and 12 is lowest.

Subband number determination section 302 then classifies subbands 1 to 12 shown in FIG. 9 into a plurality of subband groups according to the level of the specified received signal power in specification section 301. Specifically, subband number determination section 302 classifies subbands into a subband group including subbands 1, 2, and 12 having the lowest received signal power, a subband group including subbands 9 to 11 having the second lowest received signal power, a subband group including subbands 3 to 5 having the third lowest received signal power, and a subband group including subbands 6 to 8 having the highest received signal power.

Next, subband number determination section 302 determines the number of subbands used for the assigning pattern every subband group such that HeNB 300 is assigned to a subband group having lower received signal power. Since the number of subbands used for HeNB 300 is six, subband number determination section 302 determines the number of subbands used for an assigning pattern in a subband group including subbands 1, 2, and 12 as three, determines the number of subbands used for the assigning pattern in a subband group including subbands 9 to 11 as two, determines the number of subbands used for the assigning pattern in a subband group including subbands 3 to 5 as one, and determines the number of subbands used for the assigning pattern in a subband group including subbands 6 to 8 as zero, for example.

Pattern generating section 303 then generates a subband assigning pattern based on the number of subbands in each subband group determined in subband number determination section 302. That is to say, pattern generating section 303 generates the subband assigning pattern such that a larger number of subbands forming a subband group having lower received signal power are assigned to HeNB 300. As shown in FIG. 9, pattern generating section 303 extracts all subbands 1, 2, and 12 since subband number determination section 302 has determined the number of subbands as three in the subband group including subbands 1, 2, and 12, for example. As shown in FIG. 9, pattern generating section 303 also extracts two subbands of subbands 9 and 11 from subbands 9 to 11 since subband number determination section 302 has determined the number of subbands as two in the subband group including subbands 9 to 11. The same applies to subband group including subbands 3 to 5 shown in FIG. 9. On the other hand, pattern generating section 303 extracts no subband in the subband group including subbands 6 to 8 shown in FIG. 9.

That is to say, pattern generating section 303 generates the assigning pattern including the combination of subbands 1, 2, 4, 9, 11, and 12 among subbands 1 to 12 as shown in FIG. 9.

In view of the above, a subband group having lower received signal power (that is to say, the power of interference signals to HeNB 300 (or the HUE)) has a larger number of subbands used for the assigning pattern. Here, subbands forming a subband group having the highest received signal power (subbands 6 to 8) are not used for the assigning pattern as with Embodiment 2.

Here, HUE 1, HUE 2, and HUE 3 are assumed to be connected to HeNB 300. As shown in FIG. 9, assignment section 102 assigns subbands 4 and 12 to HUE 1, assigns subbands 2 and 9 to HUE 2, assigns subbands 1 and 11 to HUE 3 among subbands 1, 2, 4, 9, 11, and 12 shown in the assigning pattern.

As the power of signals from the MUE (received signal power), that is, the power of interference signals is high, the effect on the communications of HeNB 300 increases. Meanwhile, subbands having lower power (the power of interference signals) of signals from the MUE are likely to be assigned to HeNB 300. In other words, subbands having higher power (the power of interference signals) of signals from the MUE are not likely to be assigned to HeNB 300. Especially, HeNB 300 does not assign subbands (subbands 6 to 8 in FIG. 9) forming a subband group having the highest power of signals (the power of interference signals) from the MUE among a plurality of subbands to HeNB 300.

The present embodiment avoids assigning subbands to HeNB 300 (HUE) in a subband which is likely to receive interference from an MUE and therefore can suppress interference from the MUE.

HeNB 300 also generates a subband assigning pattern based on only signals from the MUE, which are detected in detection section 201, a total number of subbands available for HeNB 300, and the number of subbands used for HeNB 300 as with Embodiment 2. That is to say, HeNB 300 can generate the subband assigning pattern without exchanging information (for example, information showing the used MeNB subbands) with the MeNB as with Embodiment 2.

In view of the above, the present embodiment can suppress interference between an HeNB and an MeNB without exchanging information between the MeNB and the HeNB as with Embodiment 1. The present embodiment also avoids assigning subbands to the HeNB in subbands receiving interference from the MUE (interference bands) as with Embodiment 2. Furthermore, HeNB is likely to be assigned to subbands which are not likely to receive interference from the MUE in the present embodiment. This makes it possible to further suppress interference between the MeNB and the HeNB.

Figure 10:
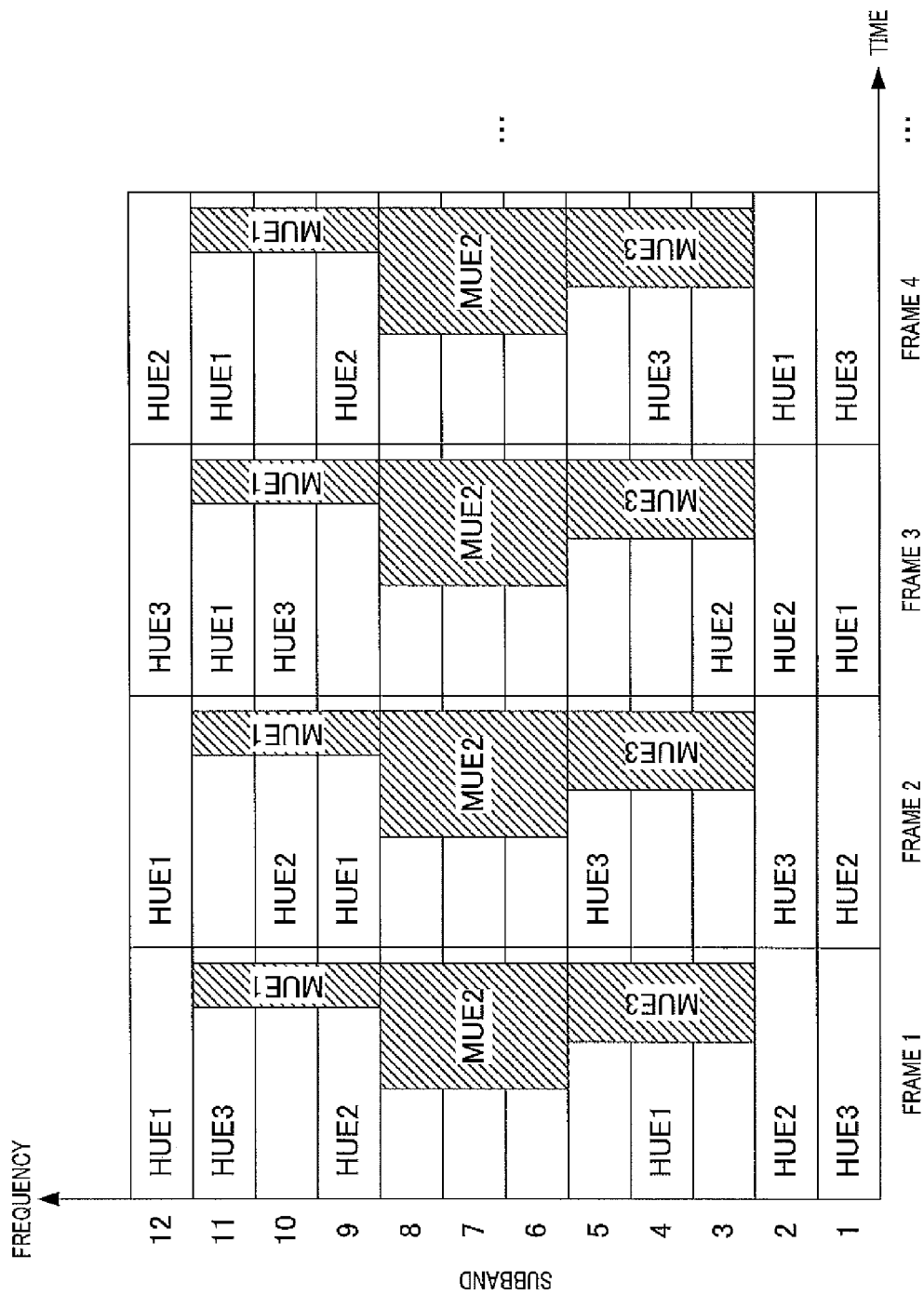
FIG. 10 is a drawing showing an assigning pattern according to Embodiment 3 of the present invention.

In the present embodiment, a case has been described where pattern generating section 303 in HeNB 300 employs the same subband combination included in a subband assigning pattern every frame. However, pattern generating section 303 may vary a subband combination included in the assigning pattern every frame by combining the present embodiment with Embodiment 1. As shown in FIG. 10, subband number determination section 302, for example, classifies twelve subbands 1 to 12 into a plurality of subband groups according to received signal power, and determines the number of subbands used for the assigning pattern every subband group such that HeNB 300 is assigned to subbands forming a subband group having lower received signal power as with FIG. 9. Pattern generating section 303 then extracts subbands used for the assigning pattern based on the number of subbands in each subband group, which is determined in subband number determination section 302. At this time, pattern generating section 303 varies a combination of subbands used for an assigning pattern every frame as shown in FIG. 10.

This avoid assigning subbands to HeNB 300 in a subband which is likely to receive interference, and can thereby suppress interference between the MeNB and HeNB 300 as with the present embodiment. Furthermore, Embodiment 3 can randomize (average) interference between the MeNB and HeNB 300 using an assigning pattern having a subband combination which varies every frame and therefore suppress interference between the MeNB and HeNB 300 as with Embodiment 1.

(Embodiment 4)

In HeNB 300 (FIG. 8) according to the present embodiment, subband number determination section 302 first classifies a plurality of subbands available for HeNB 300 into a plurality of subband groups according to the level of the received signal power specified in specification section 301 as with Embodiment 3. Subband number determination section 302 then determines the number of subbands used for an assigning pattern every subband group such that subbands are assigned to HeNB 300 in sequence from subbands forming a subband group having lower received signal power. Here, a total number of subbands determined in each subband group is the number of subbands used for HeNB 300.

Pattern generating section 303 generates an assigning pattern of subbands assigned to HeNB 300 (and an HUE) based on the number of subbands determined in subband number determination section 302. Specifically, pattern generating section 303 generates a subband assigning pattern such that subbands are assigned to HeNB 300 in sequence from subbands forming a subband group having lower received signal power among a plurality of subband groups classified according to the level of received signal power.

Next, a process in HeNB 300 according to the present embodiment will be described in detail.

Figure 11:
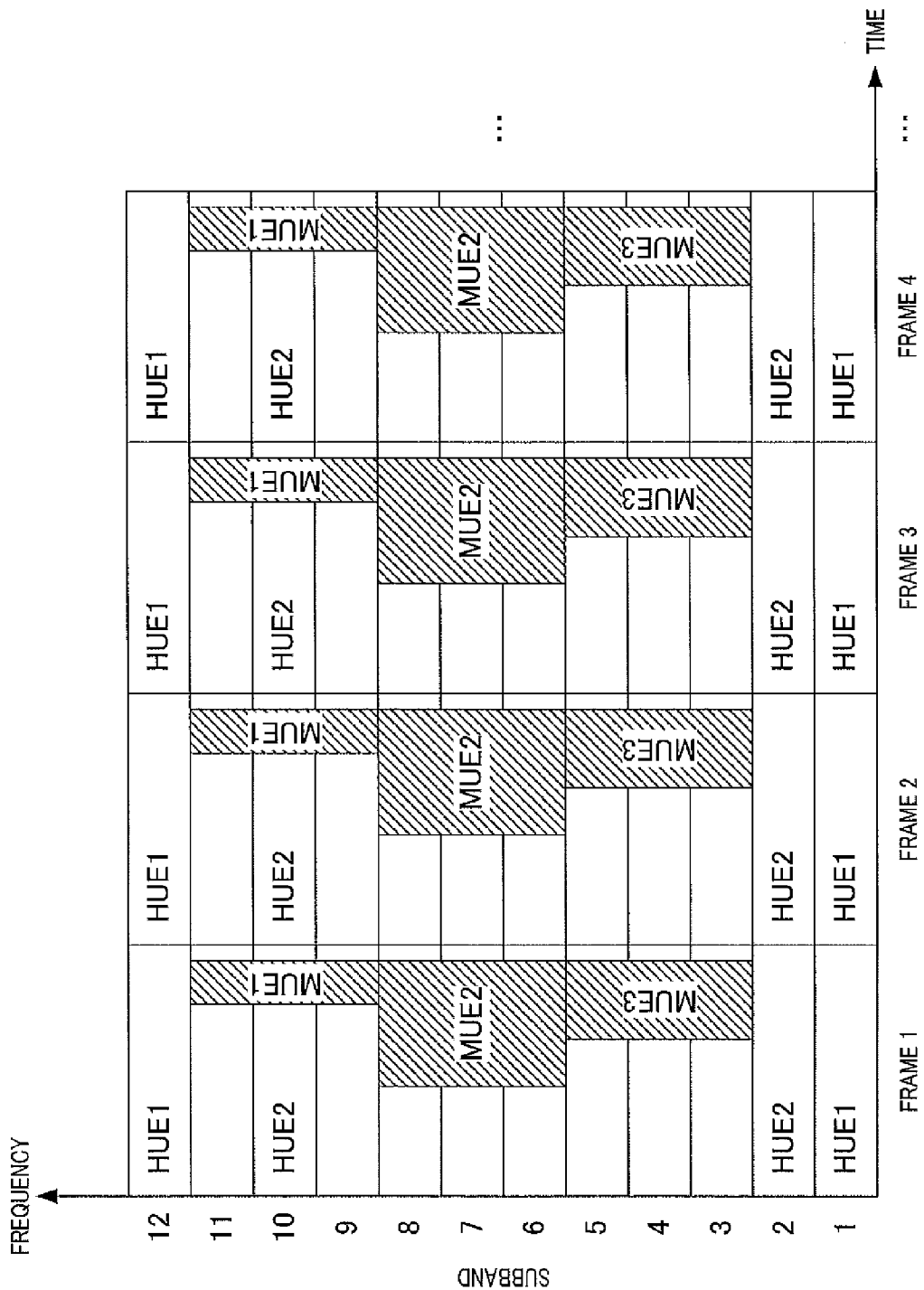
FIG. 11 is a drawing showing an assigning pattern according to Embodiment 4 of the present invention.

In the following description, subbands available for HeNB 300 are assumed to be subbands 1 to 12 (subband total number: 12) as shown in FIG. 11 as with Embodiment 3 (FIG. 9). Subbands used for HeNB 300 in each frame are assumed to be four (the number of used subbands: 4).

In HeNB 300, subbands 6 to 8 (subbands to which signals from MUE 2 are assigned) have the highest received signal power, subbands 3 to 5 (subbands to which signals from MUE 3 are assigned) have the second highest received signal power, and subbands 9 to 11 (subbands to which signals from MUE 1 are assigned) have the third highest received signal power as shown in FIG. 11 as with Embodiment 3 (FIG. 9). On the other hand, HeNB 300 does not detect any signals from the MUEs in subbands 1, 2, and 12, and the received signal power is the lowest level.

Accordingly, subband number determination section 302 classifies subbands 1 to 12 shown in FIG. 11 into a subband group including subbands 1, 2, and 12 having the lowest received signal power, a subband group including subbands 9 to 11 having the second lowest received signal power, a subband group including subbands 3 to 5 having the third lowest received signal power, and a subband group including subbands 6 to 8 having the highest received signal power as with Embodiment 3 (FIG. 9).

Next, subband number determination section 302 determines the number of subbands used for the assigning pattern every subband group such that subbands are assigned to HeNB 300 in sequence from subbands forming a subband group having lower received signal power. Since the number of subbands used for HeNB 300 is four, for example, subband number determination section 302 first determines the number of subbands used for the assigning pattern in a subband group including subbands 1, 2, and 12 having the lowest received signal power as three. Here, while the number of subbands used for HeNB 300 is four, the number of determined subbands is three. Subband number determination section 302 therefore needs to further determine another subband. Subband number determination section 302 further determines the number of subbands used for the assigning pattern as one (=4−3) in a subband group including subbands 9 to 11 having the second lowest received signal power. A total number of subbands determined in each subband group is the number of used subbands for HeNB 300 (that is to say, four). Accordingly, subband number determination section 302 determines the number of subbands used for the assigning pattern as zero in a subband group including subbands 3 to 5 and a subband group including subbands 6 to 8.

Pattern generating section 303 then generates the subband assigning pattern such that subbands are assigned to HeNB 300 in sequence from subbands forming a subband group having lower received signal power. As shown in FIG. 11, pattern generating section 303, for example, extracts all subbands 1, 2, and 12 since subband number determination section 302 has determined the number of subbands as three in the subband group including subbands 1, 2, and 12. As shown in FIG. 11, pattern generating section 303 also extracts, one subband, for example, subband 10, from subbands 9 to 11 since subband number determination section 302 has determined the number of subbands as one in the subband group including subbands 9 to 11. On the other hand, pattern generating section 303 extracts no subband in the subband group including subbands 3 to 5 and the subband group including subbands 6 to 8 shown in FIG. 11.

That is to say, pattern generating section 303 generates an assigning pattern including a combination of subbands 1, 2, 10, and 12 among subbands 1 to 12 as shown in FIG. 11.

Here, HUE 1 and HUE 2 are assumed to be connected to HeNB 300. Assignment section 102 assigns subbands 1 and 12 to HUE 1, and assigns subbands 2 and 10 to HUE 2 among subbands 1, 2, 10, and 12 shown in the assigning pattern as shown in FIG. 11.

In view of the above, HeNB 300 assigns subbands to HeNB 300 in sequence from subbands (subbands having lower interference from signals of an MUE) having lower received signal power (that is to say, power of interference signals to HeNB 300 (or an HUE)). The subbands assigned to HeNB 300 (subbands included in the assigning pattern) are a combination of subbands having lower interference from signals of the MUEs among a plurality of subbands available for HeNB 300 (subbands 1 to 12 in FIG. 11). This makes it possible to suppress interference between HeNB 300 (HUE) and an MeNB (MUE) to the lowest level.

HeNB 300 also generates the subband assigning pattern based on only signals from the MUEs, which are detected in detection section 201, a total number of subbands available for HeNB 300, and the number of subband used for HeNB 300 as with Embodiment 3. That is to say, HeNB 300 can generate the subband assigning pattern without exchanging information (for example, information showing the used MeNB subbands) with the MeNB as with Embodiment 3.

In view of the above, the present embodiment can suppress interference between an HeNB and an MeNB without exchanging information between the MeNB and the HeNB as with Embodiment 1. The present embodiment preferentially assigns subbands to the HeNB in sequence from subbands having a lower effect from signals of the MUEs, and therefore can suppress interference between the MeNB and the HeNB to the lowest level.

Figure 12:
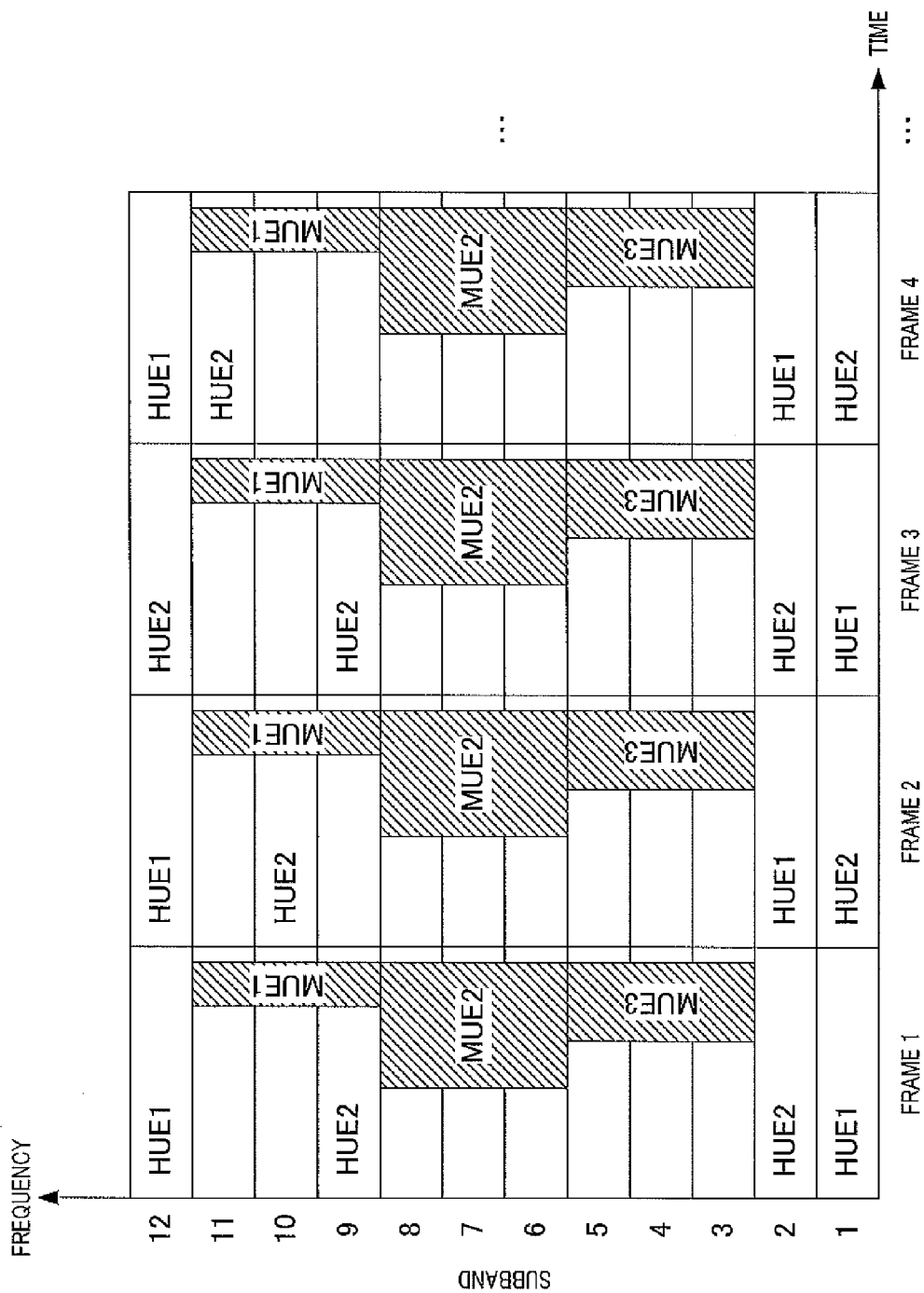
FIG. 12 is a drawing showing an assigning pattern according to Embodiment 4 of the present invention.

In the present embodiment, a case has been described where pattern generating section 303 in HeNB 300 employs the same subband combination included in a subband assigning pattern every frame. However, pattern generating section 303 may vary a subband combination included in the assigning pattern every frame by combining the present embodiment with Embodiment 1, As shown in FIG. 12, subband number determination section 302, for example, classifies twelve subbands 1 to 12 into a plurality of subband groups according to received signal power, and determines the number of subbands used for the assigning pattern every subband group in such that subbands are assigned to HeNB 300 in sequence from subbands forming a subband group having lower received signal power as with FIG. 11. Pattern generating section 303 then extracts subbands used for the assigning pattern based on the number of subbands in each subband group determined in subband number determination section 302. At this time, pattern generating section 303 varies a combination of subbands used for an assigning pattern every frame as shown in FIG. 12. Furthermore, pattern generating section 303 varies subbands assigned to different HUEs (HUE 1 and HUE 2 in FIG. 12) in subbands used for the assigning pattern, every frame.

This makes it possible to preferentially assign subbands to HeNB 300 in sequence from subbands having a lower effect from signals of the MUEs, and to suppress interference between the MeNB and the HeNB to the lowest level as with the present embodiment. Furthermore, Embodiment 4 can randomize (average) interference between the MeNB and HeNB 300 using an assigning pattern having a subband combination which varies every frame and therefore suppress interference between the MeNB and HeNB 300 as with Embodiment 1.

(Embodiment 5)

Figure 13:
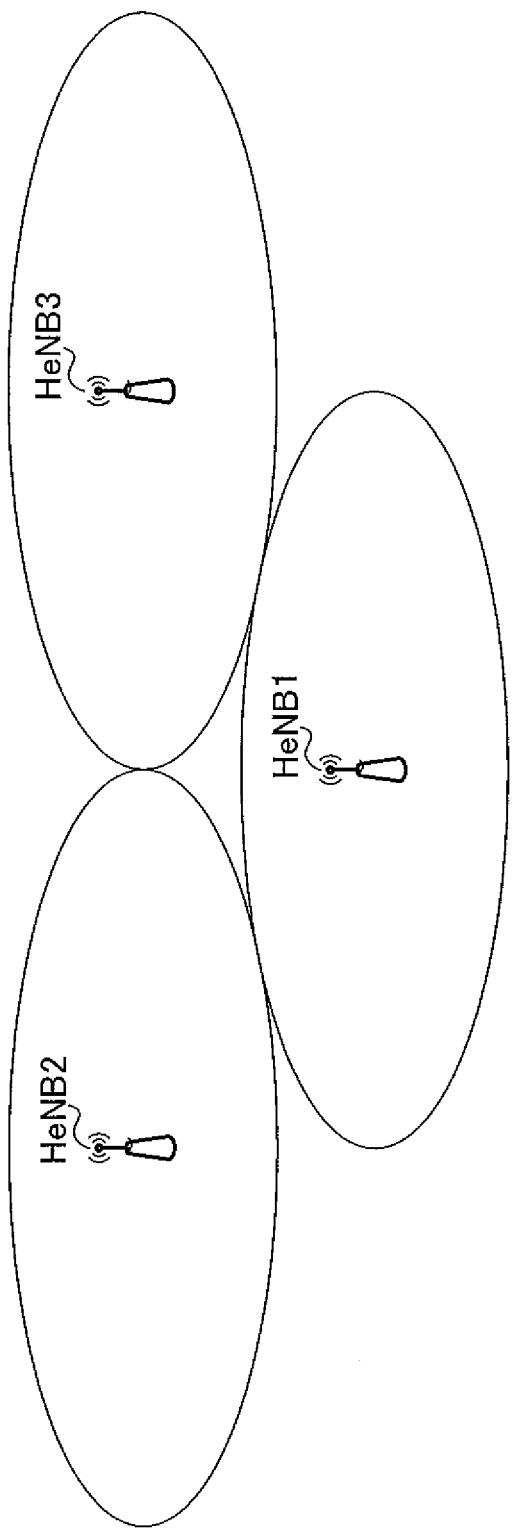
FIG. 13 is a block diagram showing an HeNB according to Embodiment 5 of the present invention.

In the present embodiment, a plurality of HeNBs which are adjacent to each other will be described. In the following description, a case where three HeNBs 1 to 3 are adjacent to each other will be described as shown in FIG. 13. HeNBs 1 to 3 shown in FIG. 13 include the configuration of HeNB 100 (FIG. 1) according to Embodiment 1, for example.

That is to say, pattern generating section 101 in each of HeNBs 1 to 3 shown in FIG. 13 generates an assigning pattern having a combination of subbands assigned to the HeNB varies every frame in subbands available for the HeNB as shown in FIG. 3. It is noted that HeNBs 1 to 3 shown in FIG. 13 independently set assigning patterns used in the HeNBs.

In view of the above, HeNBs 1 to 3 shown in FIG. 13 which are adjacent to each other independently generate assigning patterns. HeNBs 1 to 3 are therefore likely to use different assigning patterns in each frame. Specifically, although there is a possibility that a plurality of adjacent HeNBs generate the identical assigning patterns in a certain frame (the probability of using the same subband), the probability of generating the identical assigning patterns in a plurality of continuous frames is reduced. This makes it possible to randomize (average) interference which may be given between HeNBs 1 to 3 adjacent to each other shown in FIG. 13.

Accordingly, the present embodiment, for example, can reduce the probability that signals transmitted from a certain HeNB to an HUE connected to the HeNB in downlink interfere with an HUE connected to another HeNB adjacent thereto over a plurality of frames. The present embodiment can reduce the probability that signals transmitted from an HUE connected to a certain HeNB to the HeNB in uplink interfere with another adjacent HeNB over a plurality of frames.

HeNBs 1 to 3 shown in FIG. 13 can randomize (average) interference between HeNBs and an MeNB (not shown) as with Embodiment 1 and can suppress interference between the HeNBs and the MeNB.

HeNBs 1 to 3 shown in FIG. 13 each generate a subband assigning pattern based on only a total number of subbands available for HeNB 100, and the number of subbands used for HeNB 100 as with Embodiment 1. That is to say, HeNBs 1 to 3 shown in FIG. 13 can each generate the subband assigning pattern without exchanging information (for example, information showing the used subbands in each apparatus) with the MeNB, and with adjacent HeNBs.

In view of the above, the present embodiment can suppress interference between an HeNB and an MeNB without exchanging information between the MeNB and the HeNB as with Embodiment 1. Furthermore, the present embodiment can suppress interference between HeNBs without exchanging information between a plurality of adjacent HeNBs.

In the present embodiment, a case has been described where HeNBs 1 to 3 shown in FIG. 13 include the configuration of HeNB 100 (FIG. 1) according to Embodiment 1. However, HeNBs 1 to 3 shown in FIG. 13 may include the configuration of the HeNB according to Embodiments 2 to 4 (HeNB 200 (FIG. 5), HeNB 300 (FIG. 8)). In this case, the HeNB can obtain the same effect as that of each embodiment and suppress interference with HeNBs as with the present embodiment, Embodiments of the present invention have been described above.

The embodiments have been described using an LTE system as example, but the present invention is not limited to this, and can also be applied to all radio communication standards which allow a mixture of the MeNB and the HeNB.

Figure 14:
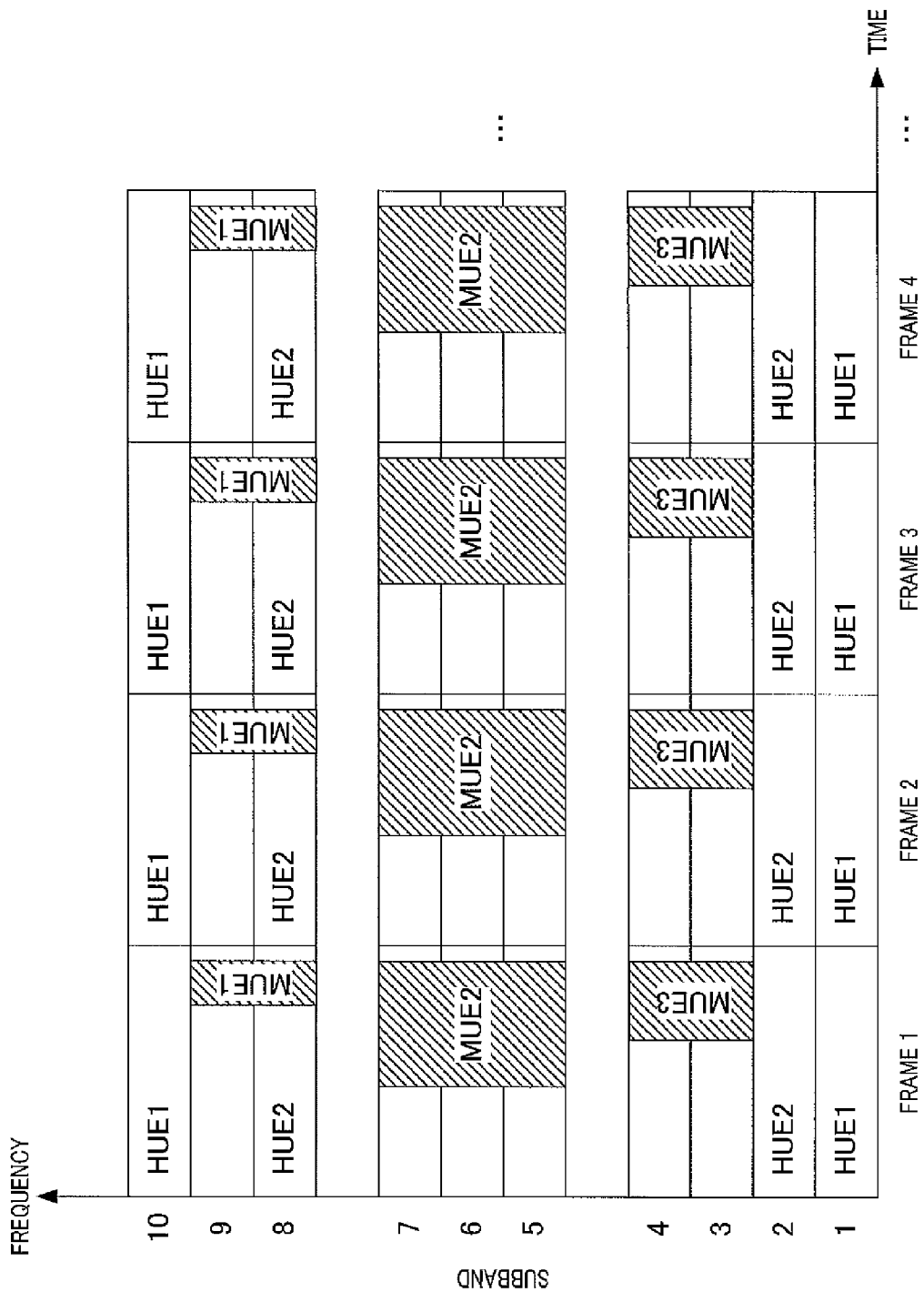
FIG. 14 is a drawing showing an assigning pattern in discontinuous subbands.
Figure 15:
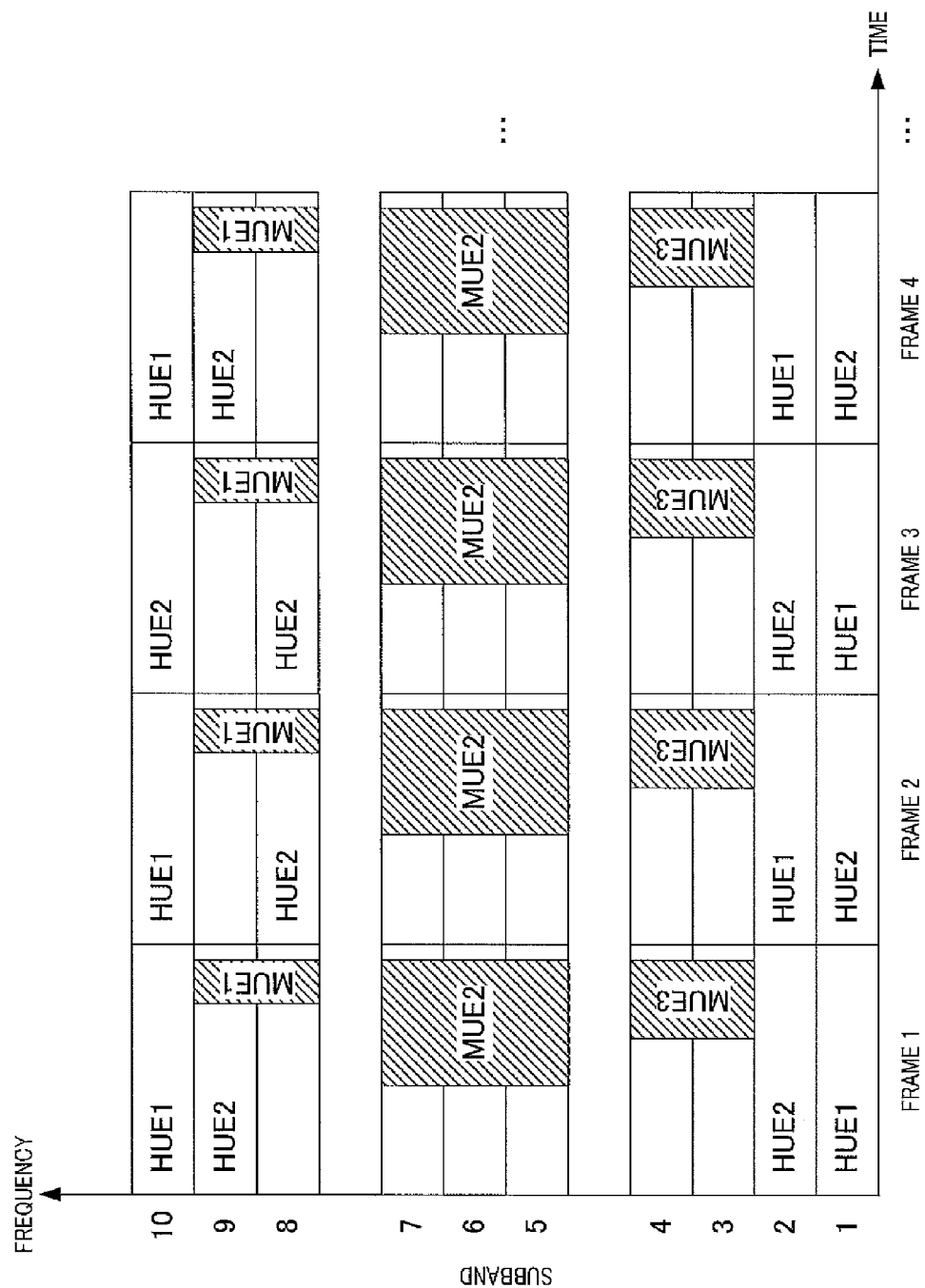
FIG. 15 is a drawing showing an assigning pattern in discontinuous subbands.

In the above embodiments, an example in which continuous subbands are used has been described. The present invention is not limited to the case of using continuous subbands, but can be applied to a case of using discontinuous subbands, for example, as shown in FIGS. 14 and 15 and can obtain the same effect as that of the above embodiments. In FIG. 14 and FIG. 15, the groups of subbands 1 to 4, subbands 5 to 7, and subbands 8 to 10 are discontinuous. FIG. 14 shows a case of employing the same subband combination included in a subband assigning pattern every frame, FIG. 15 shows a case of using different subband combination included in a subband assigning pattern every frame.

The disclosure of Japanese Patent Application No. 2010-047985, filed on Mar. 4, 2010, including the specification, drawings and abstract, is incorporated herein by reference in its entirety.

Industrial Applicability

The present invention is suitable for a mobile communication system including an MeNB, an MUE, an HeNB, and an HUE.

Reference Signs List 100, 200, 300 HeNB
101, 203, 303 Pattern generating section
102 Assignment section
103 Notification section
201 Detection section
202, 301 Specification section
302 Subband number determination section

The invention claimed is:

1. A micro base station apparatus comprising:
a detection section configured to detect signals from one or more communication terminal apparatuses to a macro base station, the macro base station forming a larger cell than the micro base station apparatus;
a specifying section configured to specify one or more subbands to which the signals from the one or more communication terminal apparatuses to the macro base station are assigned;
a generation section configured to generate an assigning pattern including a predetermined number of subbands by selecting subbands other, than the specified subbands;
an assignment section configured to assign the subbands to a communication terminal apparatus to be connected to the micro base station apparatus based on the assigning pattern.

2. The micro base station apparatus according to claim 1, wherein:
the specifying section is further configured to specify received signal power of the specified subbands, and
the generation section is further configured to generate the assigning pattern by selecting the predetermined number of subbands from among the specified subbands and the subbands other than the specified subbands, such that the lower received signal power the specified subbands have, the more likely the specified subbands are included in the assigning pattern.

3. The micro base station apparatus according to claim 2, further comprising:
a detecting section configured to detect one or more signals transmitted from the one or more communication terminal apparatuses, wherein:
the specifying section is further configured to specify the one or more subbands to which the signals from the one or more communication terminal apparatuses to the macro base station are assigned, and the received signal power of the specified subbands, based on the one or more signals detected by the detecting section.

4. The micro base station apparatus according to claim 1, wherein the generation section is further configured to generate the assigning pattern including only the subbands other than the specified subbands.

5. The micro base station apparatus according to claim 1, wherein the generation section is further configured to vary the assigning pattern for every predetermined time interval.

6. A method of micro base station comprising:
detecting signals from one or more communication terminal apparatuses to a macro base station, the macro base station forming a larger cell than the micro base station apparatus;
specifying one or more subbands to which the signals from the one or more communication terminal apparatuses to the macro base station are assigned;
generating an assigning pattern including a predetermined number of subbands by selecting subbands other than the specified subbands; and
assigning the subbands to a communication terminal apparatus to be connected to the micro base station apparatus based on the assigning pattern.

* * * * *